United States Patent [19]

Cassels

[11] Patent Number: 5,433,469
[45] Date of Patent: Jul. 18, 1995

[54] DEVICES FOR THE SAFE AND CONVENIENT SUPPORTING AND TRANSPORTING OF VEHICLE TIRES

[76] Inventor: Beth G. Cassels, 69 Happy Valley Cir., Newnan, Ga. 30263

[21] Appl. No.: 237,868

[22] Filed: May 4, 1994

[51] Int. Cl.⁶ .................................................. B62B 1/14
[52] U.S. Cl. .................................. 280/655; 280/47.27; 280/79.4; 414/430
[58] Field of Search ............ 280/651, 652, 655, 655.1, 280/47.24, 47.26, 47.27, 47.29, 47.371, 79.4; 414/426, 430

[56] References Cited

U.S. PATENT DOCUMENTS

| | | | |
|---|---|---|---|
| 2,924,427 | 2/1960 | Larson | 414/430 X |
| 3,126,111 | 3/1964 | Lewis | 414/430 |
| 4,286,796 | 9/1981 | Esposito | 280/47.27 |
| 4,465,421 | 8/1984 | Murillo | 414/430 |
| 5,356,163 | 10/1994 | Suggs, Sr. | 414/426 X |

*Primary Examiner*—Margaret A. Focarino
*Assistant Examiner*—Michael Mar

[57] ABSTRACT

A device for the safe and convenient supporting and transporting of vehicle tires comprising a base consisting of two side tubes positionable in a parallel relationship in a horizontal orientation, the tubes having front ends and rear ends, the base having a crosspiece secured to the side tubes adjacent to the front end and to the rear end with an axle secured with respect to the rear end of the side tubes with wheels rotatably secured to the ends of the axle for rotation; a handle formed of two parts, an upper part and a lower part, the upper part adapted for sliding movement up and down vertically with respect to the lower part and the base, the upper part having vertical rods and a cross piece horizontally oriented between the vertical rods at the upper end and with pairs of outwardly extending projections adjacent to the lower ends thereof, the lower part including parallel vertical rods with a cross rod at the upper end thereof and a bend for interacting with the outwardly extending projections of the upper part for vertically adjusting the upper cross rod of the upper part, the lower ends thereof being secured to the base adjacent to the rear ends; and a cradle formed of parallel vertical rods angled inwardly at their upper and lower extents and coupled to the upper ends to the lower handle part and to the rear ends of the tubing of the base, the cradle having crosspieces at intermediate extents thereof.

5 Claims, 4 Drawing Sheets

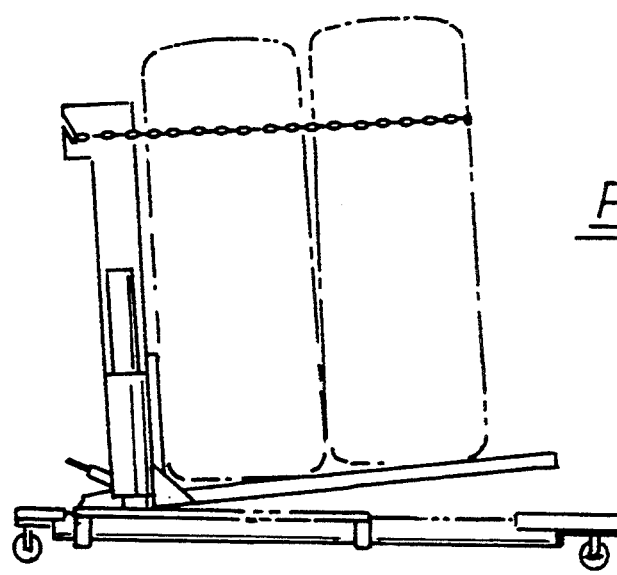
FIG 1
PRIOR ART
FIG 2
PRIOR ART
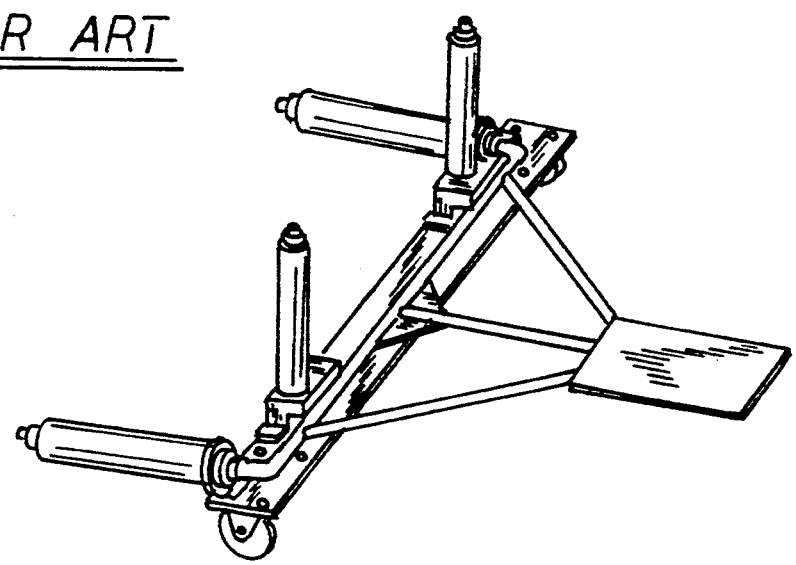

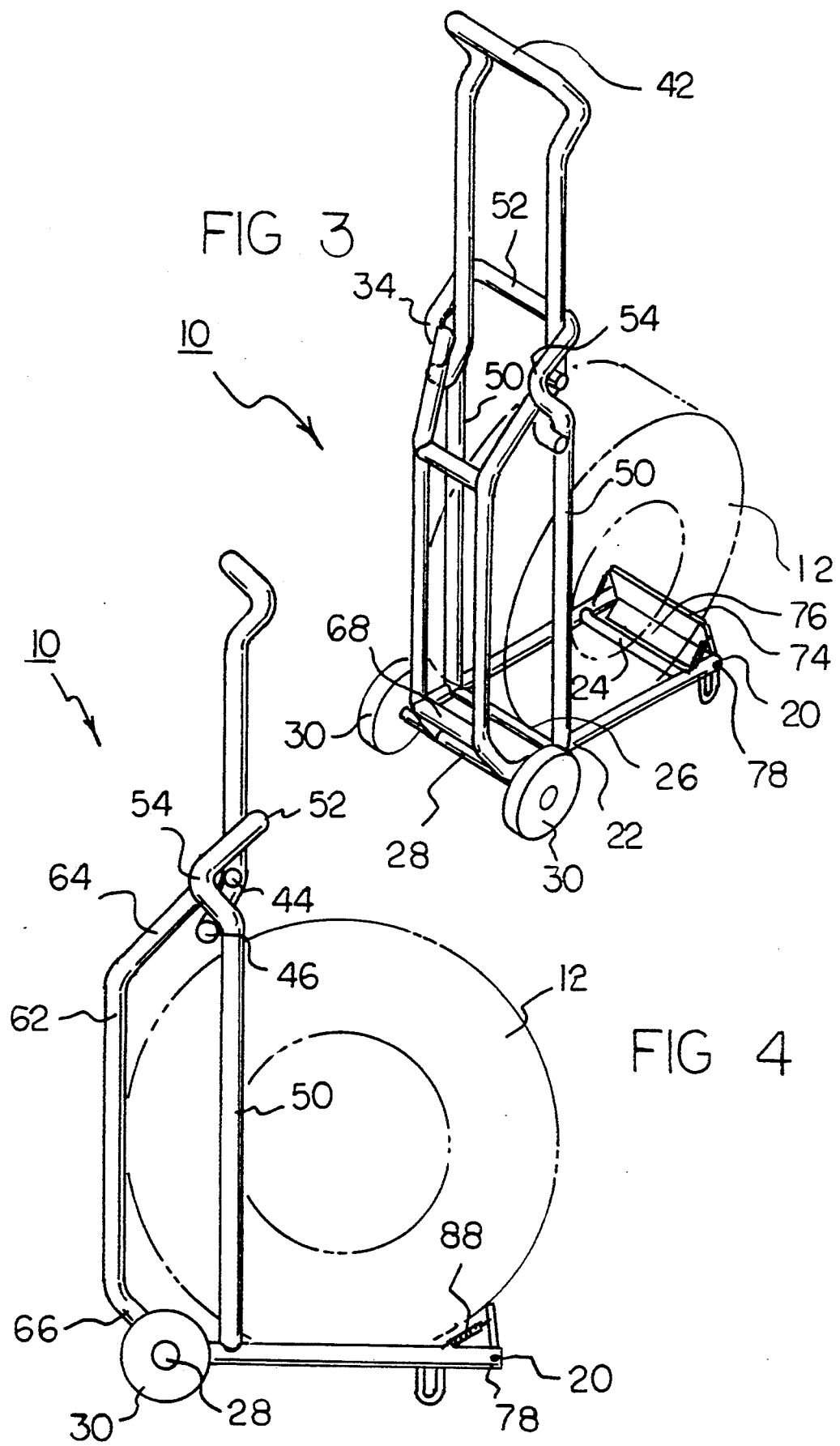

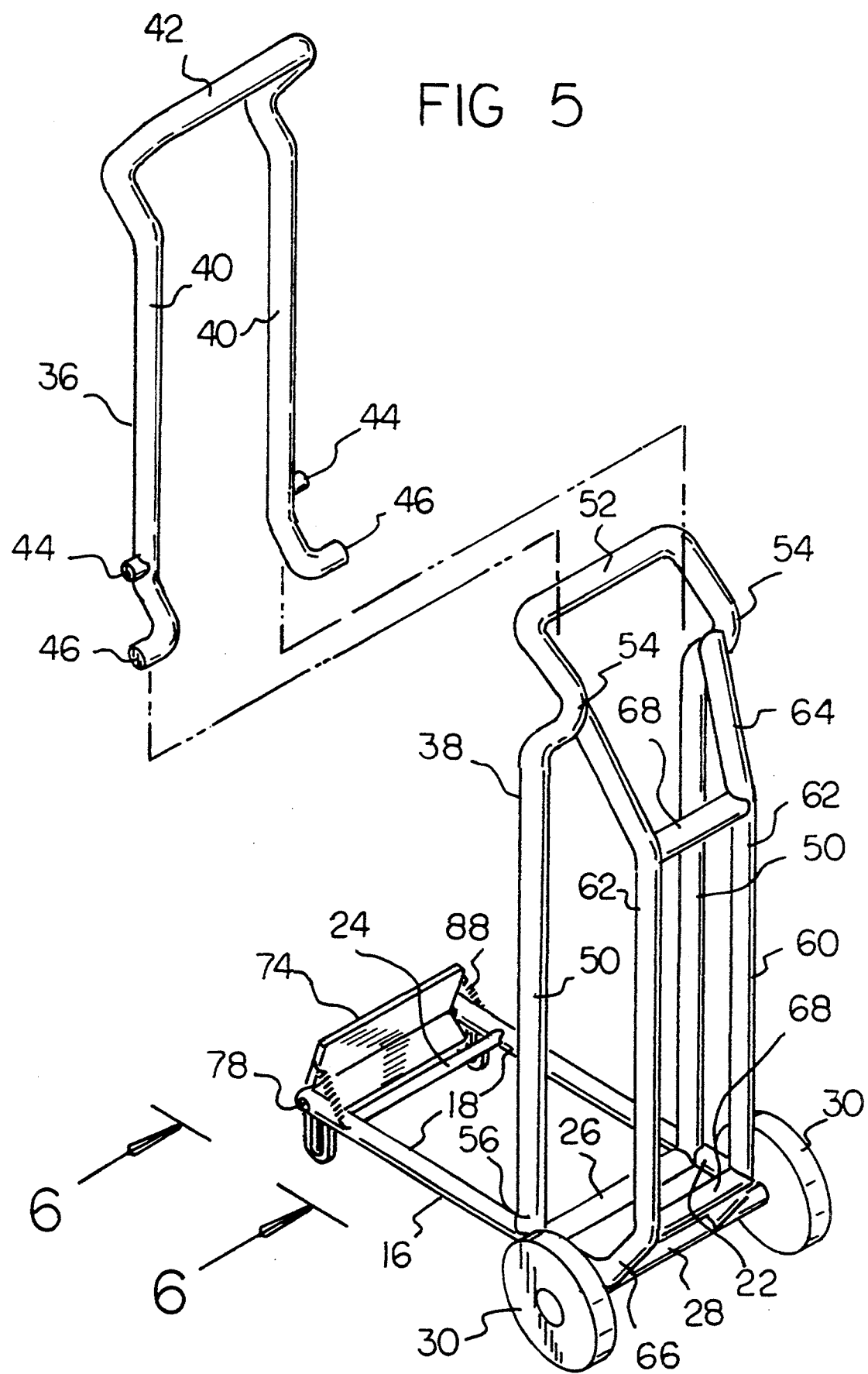

DEVICES FOR THE SAFE AND CONVENIENT SUPPORTING AND TRANSPORTING OF VEHICLE TIRES

BACKGROUND OF THE INVENTION

1. Field of the Invention

The present invention relates to devices for safely supporting and conveniently transporting vehicle tires and more particularly pertains to supporting vehicle tires on a wheeled device for their convenient transportation.

2. Description of the Prior Art

The use of devices for supporting tires and moving them from location to location is known in the prior art. More specifically, devices for supporting tires and moving them from location to location heretofore devised and utilized for the purpose of moving tires supported on a wheeled device are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,482,719 a tire lifter.

U.S. Pat. No. 3,937,343 discloses an adjustable tire cart.

U.S. Pat. No. 3,951,287 discloses a tire cart.

U.S. Pat. No. 4,460,306 discloses a wheel dolly.

U.S. Pat. No. 4,872,694 discloses a truck tire mounting device.

In this respect, the device for safely supporting and conveniently transporting vehicle tires according to the present invention substantially departs from the conventional concepts and designs of the prior art, and in doing so provides an apparatus primarily developed for the purpose of supporting vehicle tires on a wheeled device for their convenient transportation.

Therefore, it can be appreciated that there exists a continuing need for new and improved devices for safely supporting and conveniently transporting vehicle tires which can be used for supporting vehicle tires on a wheeled device for their convenient transportation. In this regard, the present invention substantially fulfills this need.

SUMMARY OF THE INVENTION

In view of the foregoing disadvantages inherent in the known types of devices for supporting tires and moving them from location to location now present in the prior art, the present invention provides an improved device for safely supporting and conveniently transporting vehicle tires. As such, the general purpose of the present invention, which will be described subsequently in greater detail, is to provide a new and improved device for safely supporting and conveniently transporting vehicle tires and method which has all the advantages of the prior art and none of the disadvantages.

To attain this, the present invention essentially comprises a new and improved device for the safe and convenient supporting and transporting of vehicle tires comprising, in combination a base consisting of two side tubes positionable in a parallel relationship in a horizontal orientation, the tubes having front ends and rear ends, the base having a crosspiece secured to the side tubes adjacent to the front end and to the rear end with an axle secured with respect to the rear end of the side tubes with wheels rotatably secured to the ends of the axle for rotation; a handle formed of two parts, an upper part and a lower part, the upper part adapted for sliding movement up and down vertically with respect to the lower part and the base, the upper part having vertical rods and a crosspiece horizontally oriented between the vertical rods at the upper end and with pairs of outwardly extending projections adjacent to the lower ends thereof, the lower part including parallel vertical rods with a cross rod at the upper end thereof and a bend for interacting with the outwardly extending projections of the upper part for vertically adjusting the upper cross rod of the upper part, the lower ends thereof being secured to the base adjacent to the rear ends; a cradle formed of parallel vertical rods angled inwardly at their upper and lower extents and coupled to the upper ends to the lower handle part and to the rear ends of the tubing of the base, the cradle having crosspieces at intermediate extents thereof for contacting a tire held thereby; a flap bar formed of a rigid sheet of metal with pins extending outwardly therefrom, the pins positioned in apertures at the forward ends of the horizontal base tubes for rotation between a downloading position whereat a tire may be rolled up its upper surface onto a location between the side bars on their crosspieces and a raised orientation wherein the edge of the sheet forms an abutment surface to preclude supported tires from inadvertently rolling therefrom, and a spring urging the flap bar to the raised orientation; and a pair of U-shaped supports secured to the base tubes adjacent to their forward ends for resting on the ground to maintain the base tubes in a horizontal orientation with the device is at rest.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the United States Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved device for safely supporting and conveniently transporting vehicle tires which have all the advantages of the prior art devices for supporting tires and moving them from location to location and none of the disadvantages.

It is another object of the present invention to provide new and improved device for safely supporting and conveniently transporting vehicle tires which may be easily and efficiently manufactured and marketed.

It is further object of the present invention to provide new and improved device for safely supporting and conveniently transporting vehicle tires which are of durable and reliable constructions.

An even further object of the present invention is to provide new and improved device for safely supporting and conveniently transporting vehicle tires which are susceptible of a low cost of manufacture with regard to both materials and labor, and which accordingly are then susceptible of low prices of sale to the consuming public, thereby making such device for safely supporting and conveniently transporting vehicle tires economically available to the buying public.

Still yet another object of the present invention is to provide new and improved device for safely supporting and conveniently transporting vehicle tires which provide in the apparatuses and methods of the prior art some of the advantages thereof, while simultaneously overcoming some of the disadvantages normally associated therewith.

Still another object of the present invention is to support vehicle tires on a wheeled device for their convenient transportation.

Lastly, it is an object of the present invention to provide new and improved devices for the safe and convenient supporting and transporting of vehicle tires comprising a base consisting of two side tubes positionable in a parallel relationship in a horizontal orientation, the tubes having front ends and rear ends, the base having a crosspiece secured to the side tubes adjacent to the front end and to the rear end with an axle secured with respect to the rear end of the side tubes with wheels rotatably secured to the ends of the axle for rotation; a handle formed of two parts, an upper part and a lower part, the upper part adapted for sliding movement up and down vertically with respect to the lower part and the base, the upper part having vertical rods and a cross piece horizontally oriented between the vertical rods at the upper end and with pairs of outwardly extending projections adjacent to the lower ends thereof, the lower part including parallel vertical rods with a cross rod at the upper end thereof and a bend for interacting with the outwardly extending projections of the upper part for vertically adjusting the upper cross rod of the upper part, the lower ends thereof being secured to the base adjacent to the rear ends; and a cradle formed of parallel vertical rods angled inwardly at their upper and lower extents and coupled to the upper ends to the lower handle part and to the rear ends of the tubing of the base, the cradle having crosspieces at intermediate extents thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a tire supporting mechanism with wheels for effecting transportation thereof.

FIG. 2 is another prior art device for supporting tires with wheels for effecting their transportation.

FIG. 3 is a perspective illustration of the preferred embodiment of the new and improved device for safely supporting and conveniently transporting vehicle tires constructed in accordance with the principles of the present invention.

FIG. 4 is a side elevational view of the device illustrated in FIG. 3.

FIG. 5 is an exploded perspective illustration of the device shown in FIGS. 3 and 4.

The same reference numerals refer to the same parts through the various Figures.

DESCRIPTION OF THE PREFERRED EMBODIMENT

Figure 6:
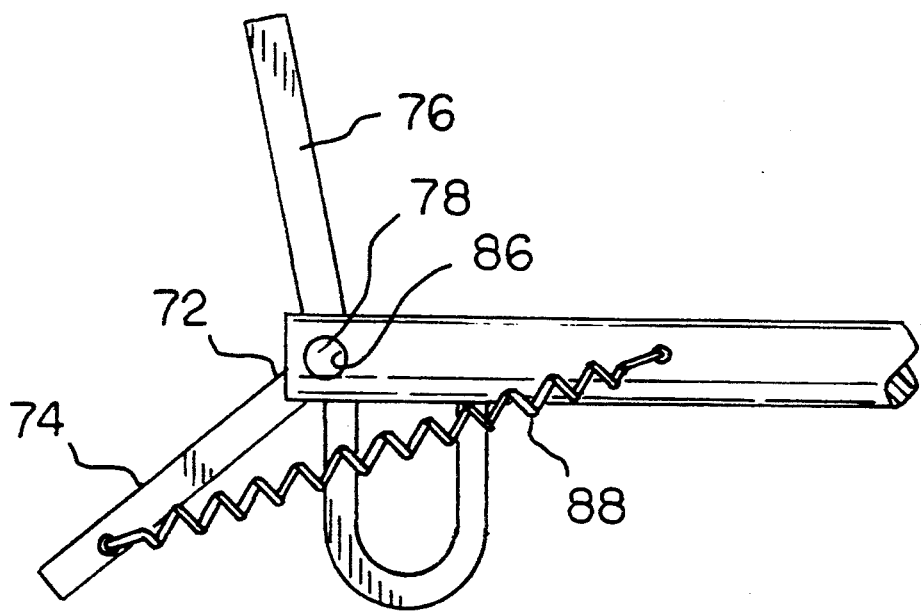
FIG. 6 is a side elevational view of the cradle portion of the device of FIGS. 3-5.

With reference now to the drawings, and in particular to FIG. 1 thereof, the preferred embodiment of the new and improved device for safely supporting and conveniently transporting vehicle tires embodying the principles and concepts of the present invention and generally designated by the reference numeral 10 will be described.

The present invention, the new and improved devices for the safe and convenient supporting and transporting of vehicle tires is a system 10 comprised of a plurality of individual components. In their broadest context, such components include a base, a handle, a cradle, a flap bar and U-shaped supports. Such components are individually configured and correlated with respect to each other so as to attain the desired objective.

More specifically, the system 10 of the present invention is for the support and transportation of vehicle tires 12. The central component of the system is a base 16. The base consists of two side tubes 18 positionable in parallel relationship with each other. They are normally oriented in a horizontal plane during the storing of tires.

Each of the tubes has a front end 20 and a rear end 22. The base also has crosspieces, 24 and 26. Such crosspieces are secured at their ends to the side tubes adjacent to the front end and to the rear end. In addition, an additional crosspiece in the form of an axle 28 is secured at its ends with respect to the side tubes at the rear end thereof. Wheels 30 are rotatably supported by the ends of the axle and secured thereto for rotation during the moving of tires supported on the base.

The next major component of the system 10 is a handle 34. The handle is formed of two parts, an upper part 36 and a lower part 38. The upper part is adapted for sliding movement up and down vertically with respect to the lower part at the base. In this manner, the upper part of the handle may be lowered when not in use or it may be raised for being grasped by a user during movement of the device with or without supported tires.

The upper part is formed to have vertical rods 40 and a crosspiece 42. These elements are horizontally oriented between the vertical rods at the upper end. They are also provided with pairs of outwardly extending projections 44 and 46 adjacent to the lower ends of the upper part.

The lower part includes parallel vertical rods 50 with a cross rod 52. The cross rod is at the upper end of the lower part. Also included is a bend 54 for interacting with the outwardly extending projections of the upper part. This is for the vertical adjustment of the upper cross rod of the upper part.

The lower ends of the lower part are secured to the base adjacent to the rear ends of the side tubes.

The next component is the cradle 60. The cradle is formed of parallel vertical rods 62. Such parallel rods are angled inwardly at their upper and lower extents 64 and 66. The rods of the cradle are coupled at their upper ends to the lower handle part and to the rear ends of the tubing of the base at their lower ends. The cradle has crosspieces 68 at the intermediate extents thereof. This is for contacting and supporting a tire held thereby during transportation.

Figure 7:
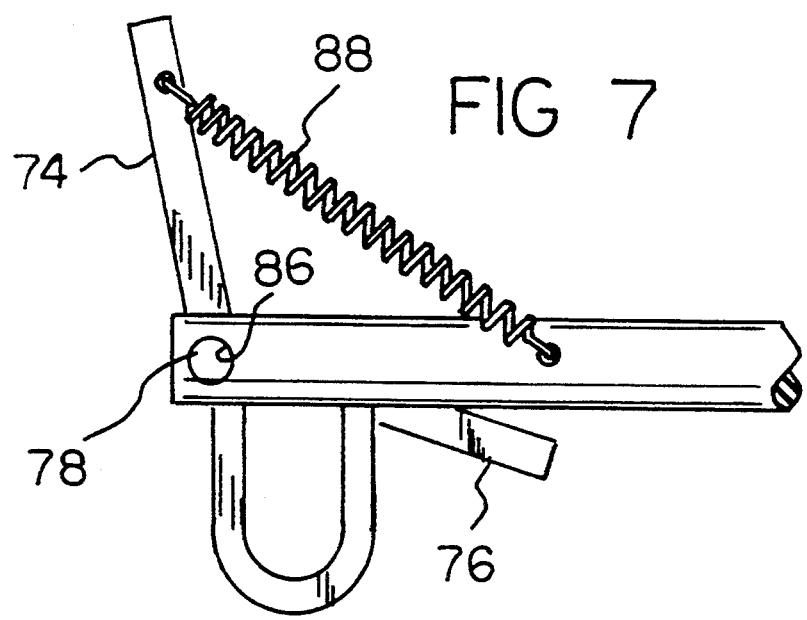
FIG. 7 is a side elevational view of the device illustrated in FIG. 6 but showing an alternate orientation thereof.

Next provided is a flap bar 72. The flap bar is formed of rigid sheets 74 and 76 of metal. They are formed and coupled together along adjacent edges to form an angle of about 90 degrees. In addition, pins 78 extend outwardly from the sheets at their point of joining. The pins are positioned in apertures 80 at the forward ends of the horizontal base tubes. This is to allow for rotation between a downloading position as shown in FIG. 6. In this position a tire may be rolled up its upper surface onto a location between the side bars on their crosspieces. The flap bar may also be positioned in a raised orientation as shown in FIG. 7. In such orientation, the edge of the sheet at the highest elevation forms an abutment surface. Such abutment surfaces functions to preclude supported tires from inadvertently rolling from the device. In addition, a pair of springs 88 are coupled with respect to the base and the flap bar tending to urge the flap bar to the raised orientation.

The last component of the system 10 is a pair of U-shaped supports 90. Such supports are secured to the base tubes adjacent to their forward ends. Such U-shaped supports are for resting on the ground to maintain the base tubes in a horizontal orientation when the device is at rest.

Automobile tires are heavy, cumbersome, and dirty objects that are difficult to move around. The present invention is a device that allows a person to transport a tire with ease and minimal contact, reducing the chance of getting dirty. It consists of a wheeled steel frame that supports a tire. A spring-actuated flap in front provides a ramp that the tire rolls up on as it is being loaded into the present invention. As the tire crosses the flap axis it drops back to the floor and rolls back to a rear support, actuating a spring toggle that flips the flap up against the tire, locking it in the caddy. An upright handle on the back allows the caddy to be tilted back on its wheels, raising the tire so it can be transported.

The base of the present invention consists of two sides made of 1½ inches steel tubing about 30 inches long for 13 or 14 inch tires or 32 inches for 14 or 15 inch tires. These are welded to two crosspieces to form a rectangle about ten inches apart inside. The rear crosspiece is a piece of 1½ inches tubing, welded four inches from the ends. The front crosspiece is a piece of ¾ inches tubing welded to the lower half of the sides 2 inches from the ends. An axle made from a ⅜ inches diameter steel rod 18 inches long goes through a pair of ⅜ inches holes ⅜ inches from the back end of the sides. Two six inch diameter wheels are mounted on its ends and secured by cotter pins.

The handle is in two parts, with the upper part sliding up and down inside the lower part. Both parts are made of 1½ inches steel tubing about 84 inches long, bent ninety degrees twice to form a crosspiece in the middle and two equal length end pieces that are parallel to each other. The lower part is ten inches apart on the inside and the upper part is ten inches apart on the outside.

The lower part has another bend of around twenty degrees about seven inches from the crosspiece such that the inside of the crosspiece is offset 2⅜ inches from the outside of the parallel sections. There is a slight indentation on the inside of the bend. It is welded perpendicularly to the base at the rear crosspiece.

A cradle is welded behind the lower part to keep the tire from falling out when the invention is tilted backward. The cradle is made of two ¾ inches steel tubes about 36 inches long that are welded to the back ends of the base and the back of the crosspiece ends. One ¾ inches crosspiece is welded between them above the base and a second crosspiece is welded between them 19 inches above the base.

The upper part end pieces are bent outward ninety degrees about two inches from the ends, then are bent to around twenty degrees about seven inches from the ends such that the inside of the end is offset 2⅜ inches from the outside of the parallel sections. A 1¼ inches long piece of ¾ inches steel pipe is welded to the outside of the end pieces at the center of the twenty degree bends. The upper part is inserted into the lower part by squeezing the ends together and sliding the upper part inside the lower part behind its crosspiece with the pipe stubs on the crosspiece side and the bent end on the opposite sides.

A flap bar is made from a 14½ inches long piece of ¼ inches steel rod with one end bent ninety degrees to form a ½ inches crank with a ½ inches throw. The flap is a piece of ⅛ inches sheet steel 9¾ inches long and seven inches wide that is welded to the bar after it has been placed in the base. The flap bar is inserted into a pair of ¼ inches holes ⅜ inches from the front ends of the sides, and is secured by a flat washer and cotter pin at both sides. The flap and bar are welded with the crank side of the bar under the flap and two inches from the inner edge.

A U-shaped piece of ¼ inches steel rod is welded under each front end to support the base. A 1½ inches long ¼ inches bar is welded to the inside of the support under the flap bar crank, projecting out under the crank. One end of a strong coil spring is hooked through a ½ inches hole in its end, and the other end of the spring is hooked over the crank between two flat washers that are secured by cotter pins.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved device for the safe and convenient supporting and transporting of vehicle tires comprising, in combination:
    a base consisting of two side tubes positionable in a parallel relationship in a horizontal orientation, the tubes having front ends and rear ends, the base having a crosspiece secured to the side tubes adjacent to the front end and to the rear end with an axle secured with respect to the rear end of the side tubes with wheels rotatably secured to the ends of the axle for rotation;
    a handle formed of two parts, an upper part and a lower part, the upper part adapted for sliding movement up and down vertically with respect to the lower part and the base, the upper part having vertical rods and a crosspiece horizontally oriented between upper ends of the vertical rods and the upper part having pairs of outwardly extending projections adjacent lower ends thereof, the lower part including parallel vertical rods with a cross rod extending between upper ends thereof and a bend for interacting with the pairs of outwardly extending projections of the upper part for vertically adjusting the cross piece of the upper part, the lower part having lower ends secured to the base adjacent to the rear ends of the side tubes;
    a cradle formed of parallel vertical rods angled inwardly at their upper and lower extents and coupled at upper ends thereof to the lower handle part and at lower ends thereof to the rear ends of the side tubes of the base, and the cradle having crosspieces at intermediate extents thereof for contacting a tire held thereby, the intermediate extents being located rearwardly of the lower part of the handle;
    a flap bar formed of a rigid sheet of metal with pins extending outwardly therefrom, the pins positioned in apertures at the forward ends of the horizontal base tubes for rotation between a downloading position whereat a tire may be rolled along an upper surface onto a location between the side bars on their crosspieces and a raised orientation wherein an edge of the sheet forms an abutment surface to preclude supported tires from inadvertently rolling therefrom, and a spring urging the flap bar to the raised orientation; and
    a pair of U-shaped supports secured to the base tubes adjacent to their forward ends for resting on the ground to maintain the base tubes in a horizontal orientation with the device is at rest.

2. A device for the safe and convenient supporting and transporting of vehicle tires comprising:
    a base consisting of two side tubes positionable in a parallel relationship in a horizontal orientation, the tubes having front ends and rear ends, the base having a crosspiece secured to the side tubes adjacent to the front end and to the rear end with an axle secured with respect to the rear end of the side tubes with wheels rotatably secured to the ends of the axle for rotation;
    a handle formed of two parts, an upper part and a lower part, the upper part adapted for sliding movement up and down vertically with respect to the lower part and the base, the upper part having vertical rods and a cross piece horizontally oriented between upper ends of the vertical rods and the upper part having pairs of outwardly extending projections adjacent lower ends thereof, the lower part including parallel vertical rods with a cross rod extending between upper ends thereof and a bend for interacting with the pairs of outwardly extending projections of the upper part for vertically adjusting the cross piece of the upper part, the lower part having lower ends secured to the base adjacent to the rear ends of the side tubes; and
    a cradle formed of parallel vertical rods angled inwardly at their upper and lower extents and coupled at upper ends thereof to the lower handle part and at lower ends thereof to the rear ends of the side tubes of the base, and the cradle having crosspieces at intermediate extents thereof, the intermediate extents being located rearwardly of the lower part of the handle.

3. The device as set forth in claim 2 and further including:
    a flap bar formed of a rigid sheet of metal with pins extending outwardly therefrom, the pins positioned in apertures at the forward ends of the horizontal base tubes for rotation between a downloading position and a raised orientation.

4. The device as set forth in claim 2 and further including:
    a pair of U-shaped supports secured to the base tubes adjacent to their forward ends for resting on the ground to maintain the base tubes in a horizontal orientation with the device is at rest.

5. The device as set forth in claim 2 wherein the coupled rods and tubes of the device are welded.

* * * * *